P. H. HORAN.
APPARATUS FOR BAKING ALTAR BREAD OR WAFERS.
No. 184,623. Patented Nov. 21, 1876.
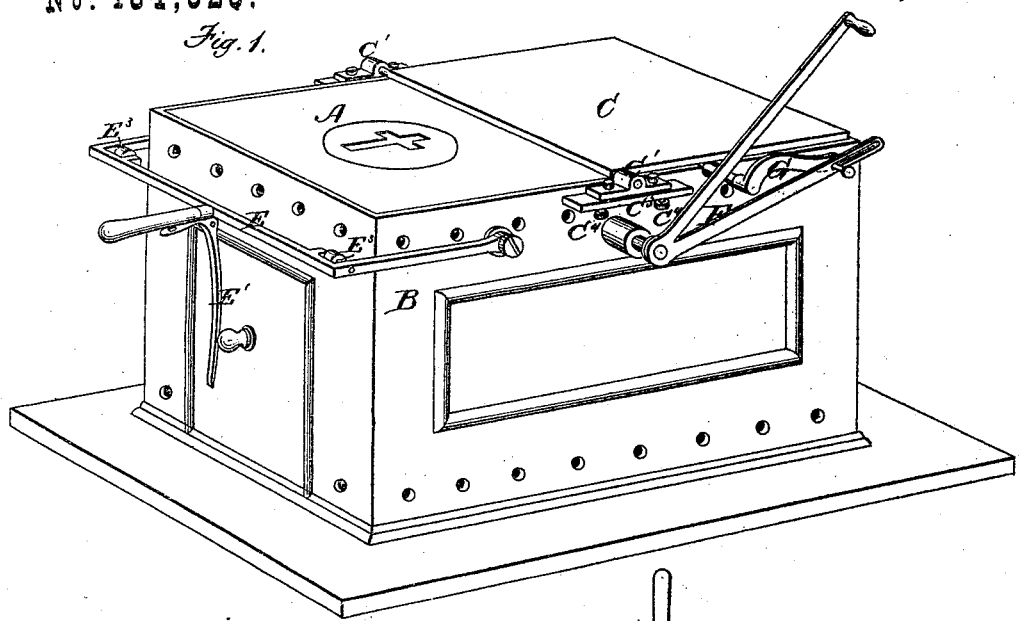
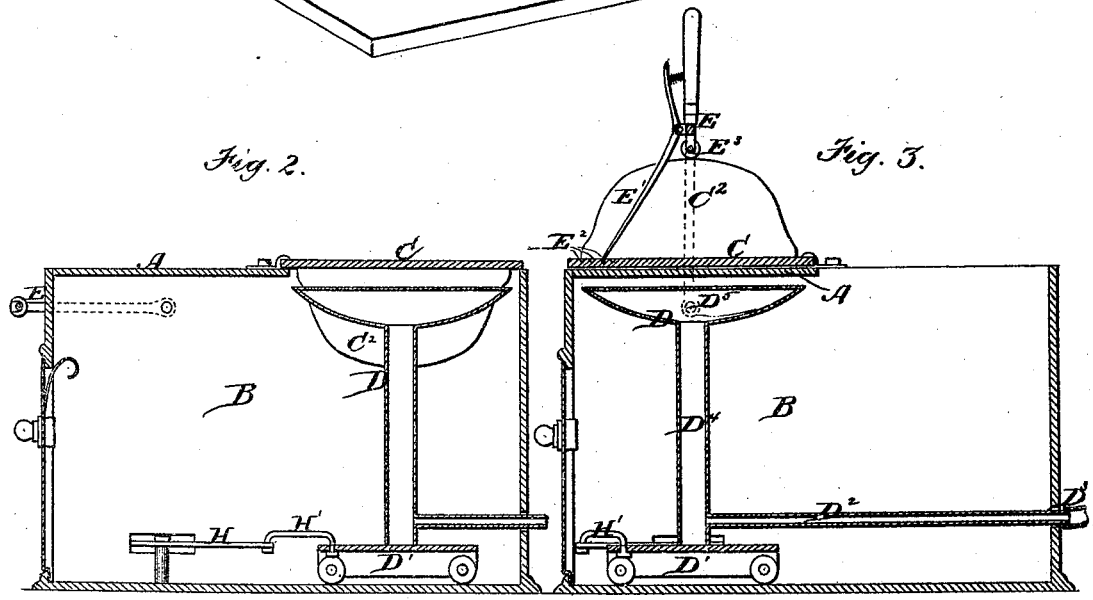
Witnesses.
Inventor.
P. H. Horan
by his Attys

UNITED STATES PATENT OFFICE.

PATRICK H. HORAN, OF BOSTON, MASSACHUSETTS, ASSIGNOR TO HORAN BROTHERS, OF SAME PLACE.

IMPROVEMENT IN APPARATUS FOR BAKING ALTAR BREAD OR WAFERS.

Specification forming part of Letters Patent No. 184,623, dated November 21, 1876; application filed October 9, 1876.

*To all whom it may concern:*

Be it known that I, PATRICK H. HORAN, of Boston, in the county of Suffolk and State of Massachusetts, have invented certain Improvements in Apparatus for Baking Altar Bread or Wafers, of which the following is a specification:

In the accompanying drawing, forming a part of this specification, Figure 1 represents a perspective view of my invention, showing the hinged plate in position for being heated. Fig. 2 represents a longitudinal vertical central section of the same. Fig. 3 represents a similar section, showing the apparatus adjusted for baking.

Similar letters of reference refer to like parts.

This invention relates to apparatus for forming and baking the altar bread or wafers used for sacramental purposes in Catholic churches. It is desirable that these wafers should be very white and thin, the usual thickness not exceeding that of ordinary bristol-board.

The object of the invention is to produce an apparatus for conveniently and expeditiously forming and baking wafers having the desired qualities of thinness and whiteness; and to this end it consists, mainly, in an apparatus combining a stationary horizontal plate, on which the batter to be baked is spread, a hinged plate, adapted to be first heated and then turned so as to press upon the stationary plate and crowd the batter thereon into a thin sheet, and hold it during the baking operation, and a movable heater, preferably a gas-stove, adapted to heat the hinged and the stationary plate in succession, the plates being located on a suitable stationary support. The invention also consists in certain details of construction, whereby the movable parts of the apparatus are operated, and also in the construction of the gas-stove or heater, all of which I will now proceed to describe.

In the drawings, A represents the stationary horizontal plate, which is located on the top of a stationary casing or support, B, and covers about half of said casing. C represents the hinged plate, which is provided with trunnions working in bearing-blocks $C^1$ on the casing B, and is adapted, when turned in one direction, to cover the other half of the casing, as shown in Figs. 1 and 2, and when turned in the opposite direction to rest upon and cover the upper surface of the plate A, as shown in Fig. 3. The plate C is provided with two rounded lugs, $C^2$, which, when the plate is turned over upon the plate A, project upwardly, and form bearings for the horizontal part of a bifurcated lever, E, the lugs being located near opposite edges of the plate. The lever E is pivoted to the sides of the casing, and when turned upwardly presses down upon the lugs $C^2$, and thus presses and holds the plate C against the plate A. The lever E is preferably provided with a dog or pawl, $E^1$, which engages with notches $E^2$, cut in the surface of the plate C, and holds the lever from slipping and releasing its pressure on the plate. $E^3$ $E^3$ are friction-rollers attached to the lever E at the points where it bears upon the lugs $C^2$.

The swinging or turning of the plate C may be effected in any desired manner. I prefer to accomplish it by means of a bell-crank lever, F, pivoted to the side of the casing B, and a crank, G, attached to the plate C, the crank G working in a slot in one arm of the lever F, while the other arm is provided with a suitable handle. By a movement of the lever F the plate C may be turned as desired.

The bearing-blocks $C^1$, in which the trunnions of the plate C work, are preferably made vertically adjustable, so as to adapt the plate C to be adjusted vertically to a slight degree, and thus regulate the thickness of the wafers. This adjustment is effected in the present case by screwing the blocks $C^1$ to shelves $C^3$, through which project upwardly screws $C^4$, the latter forming adjustable bearings for the blocks. By loosening the screws which attach the blocks to the shelves, and adjusting the screws $C^4$ upwardly, the blocks $C^1$ will be raised.

The proximate surfaces of the plates A C are preferably polished, and may, if desired, be provided with symbols *in intaglio*, to be imparted to the wafers.

D represents the movable heater, which is, by preference, a small gas-stove or burner, supported on a truck, $D^1$, and provided with a gas-pipe, $D^2$, which projects through a hole in the casing B, and is connected with a flexible gas-tube, $D^3$. The heater, in the present case, is composed of a vertical tube, $D^4$, into which the gas-pipe $D^2$ enters. The tube $D^4$ communicates with a chamber, $D^5$, having a flat perforated upper surface, the area of which is nearly equal to that of the plate A or C.

Gas is admitted into the tube $D^4$ and chamber $D^5$, and ignited at the perforations in the surface of the chamber, which is so high as to be in close proximity to the plates A C. The heater is adapted to be moved back and forth in the casing B, so as to heat either of the plates A C, and its movement is preferably effected by means of a compound lever, composed of an arm, H, pivoted to the casing, and projecting horizontally through the side thereof, and a crank, H', jointed to the arm H and to the truck $D^1$.

In operating the apparatus, the plate C is turned away from the plate A, and over the end of the casing, and the heater is moved under it, as shown in Fig. 2, until the plate C is sufficiently heated. Meanwhile a quantity of batter is poured onto the plate A, and when the plate C is heated, it is turned over onto the plate A and pressed down, and held by the lever E, as shown in Fig. 3, thus crowding the batter into a thin sheet. At the same time the heater is moved along under the plate A and allowed to remain until the latter is heated and the wafer baked, after which it is moved to the other end of the casing, and the plate C is again swung over it to be reheated, thus exposing the wafer, which is removed, the apparatus being then ready for a repetition of the operation. In this manner very thin white wafers can be conveniently and rapidly made without being burned or browned, ordinary care being exercised.

I claim as my invention—

1. In an apparatus for baking wafers, the combination of a stationary plate, a pivoted plate adapted to be heated, and subsequently pressed against the stationary plate, and a movable heater adapted to heat the pivoted and the stationary plate successively, said plates being located on a suitable stationary support, as set forth.

2. The casing B, provided with the stationary plate A, the hinged plate C, and the movable heater D, as and for the purpose set forth.

3. The pivoted plate C, having lugs $C^1$, combined with the bifurcated lever E, as set forth.

4. The bifurcated lever E, having friction-rollers $E^2$, combined with the plate C, having lugs $C^1$, as set forth.

5. The bifurcated lever E, having the dog or pawl $E^1$, combined with the plate C, having lugs $C^1$ and notches $E^2$, as set forth.

6. The pivoted plate C, having vertically-adjustable bearings, combined with the stationary plate A, as set forth.

7. The pivoted plate C, having the crank G, combined with the bell-crank lever F, as set forth.

8. The heater composed of the vertical tube $D^4$ and perforated chamber $D^5$, located on the truck $D^1$, and provided with flexible gas-connections, as set forth.

9. The compound lever H H', combined with the truck $D^1$ and casing B, as set forth.

In testimony whereof I have signed my name to this specification in the presence of two subscribing witnesses.

PATRICK H. HORAN.

Witnesses:
 JOSEPH J. HORAN,
 C. F. BROWN.